United States Patent [19]

Dugan et al.

[11] 4,250,835
[45] Feb. 17, 1981

[54] APPARATUS AND METHOD FOR REARING SHRIMP

[75] Inventors: Charles Dugan, Goulds; Timothy Dugan, Homestead, both of Fla.

[73] Assignee: Farm Fresh Shrimp Corporation, Fort Lauderdale, Fla.

[21] Appl. No.: 12,860

[22] Filed: Feb. 16, 1979

Related U.S. Application Data

[63] Continuation-in-part of Ser. No. 925,793, Jul. 18, 1978.

[51] Int. Cl.³ ............................................. A01K 61/00
[52] U.S. Cl. ........................................................ 119/2
[58] Field of Search ...................... 119/2, 3, 4; 405/52

[56] References Cited

U.S. PATENT DOCUMENTS

| | | | |
|---|---|---|---|
| 2,827,268 | 3/1958 | Staaf | 405/52 X |
| 3,452,966 | 7/1969 | Smolski | 119/3 X |
| 4,044,720 | 8/1977 | Fast | 119/3 |
| 4,051,810 | 10/1977 | Breit | 119/3 |

*Primary Examiner*—Hugh R. Chamblee
*Attorney, Agent, or Firm*—Kenyon & Kenyon

[57] ABSTRACT

An apparatus and method for rearing shrimp through the larvae stage wherein the shrimp are subjected to controlled conditions and a common enclosure for the male and female adult shrimp is provided which permits uncontrolled access of the shrimp to one another and wherein the shrimp are maintained through a plurality of cycles of mating, spawning and hatching. The system is further provided with filtration means for filtering the medium of the common enclosure and with collecting means for collecting hatched shrimp at preselected times from the common enclosure medium as the medium moves into the filtration means. In further aspects of the invention, an improved larvae tank structure and larvae feeding system are also disclosed.

20 Claims, 14 Drawing Figures

APPARATUS AND METHOD FOR REARING SHRIMP

BACKGROUND OF THE INVENTION

This application is a continuation-in-part of our copending application, Ser. No. 925,793, filed July 18, 1978.

This invention relates to a process and system for rearing shrimp and, in particular, to a process and system for rearing shrimp to the post-larvae stage on a commercial scale under controlled conditions.

In recent years, there has been considerable interest in the development of techniques for rearing or cultivating shrimp in artifical or indoor environments under controlled conditions. Techniques of this type can be viewed as falling into two types of systems and processes directed to the growing of shrimp before and after they have reached the larvae stage. The former type systems and processes primarily concern the rearing stages of mating of adult shrimp, spawning of shrimp eggs by the gravid female, hatching of the spawned eggs, and the cultivation of the hatched baby shrimp to the post-larvae stage. More particularly, these systems and processes have attempted to control the environmental conditions, such as, for example, lighting, temperature, and water make-up, so as to provide conditions which promote the aforementioned rearing stages year round. However, while successful in this regard to some degree, they have often employed cumbersome procedures requiring significant amounts of time. As a result, they have not proved entirely suitable for commercial production.

For example, in these systems, it is often the case that the stages of mating, spawning, hatching and cultivating require the movement of the adult shrimp to and from various tanks, which is a time-consuming process. Thus, females, once they are gravid, are often moved from their mating or brood tank to a spawning tank where they drop their eggs. Likewise, the females, after spawning, are again moved from the spawning tank prior to the hatching process. Movement of the adult shrimp from the brood tank is also often carried out to permit drainage and subsequent refilling of the tank.

U.S. Pat. No. 3,473,509 discloses one such controlled type process in which after mating and spawning, the adult shrimp are moved from the tank prior to hatching. U.S. Pat. No. 3,682,138 discloses another of these processes. In this case, each adult female shrimp is isolated from a male shrimp, until the female shrimp has molted and is ready to mate. At this time, the barrier between the shrimp is removed and mating occurs. Subsequent thereto, the female is removed from the tank to a further facility where hatching is to take place. Further patent references disclosing similar movement of a gravid female to a separate hatching tank are as follows: U.S. Pat. Nos. 3,685,489; 3,696,788; 3,540,414. Additionally, this type of movement of a gravid female is disclosed in C. C. Dugan, W. Hagood, Thomas A. Franks, "Development of Spawning and Mass Larvae Rearing Techniques for Brackish-Freshwater Shrimps of the Genus Macrobrachium (Decopoda Palaemonidae), " *Florida Marine Publications*, No. 12 (October 1975). The latter publication further discloses a collection system for collecting the shrimp after hatching by trapping them in collectors placed in the water flow passing from the hatching tank.

As can be appreciated, the above movement of the adult shrimp from one tank to another is time consuming and not entirely satisfactory where commercial production of shrimp is sought.

It is thus an object of the present invention to provide a process and apparatus for cultivation of shrimp to the larvae stage which is more efficient and, hence, geared to commercial production.

In systems of the above type, once hatching has occurred, the resultant baby shrimp are placed in so-called larvae tanks where they are kept until they mature through the larvae stage. The larvae tanks provided to date, however, have suffered from a variety of problems, all of which have contributed to larvae mortality. One tank construction, which has had some degree of success, includes an upper cylindrical tank portion and a lower or bottom conical tank portion. This type of construction facilitates suspension of the larvae and larvae food, thereby preventing the accumulation of bottom debris. However, the sharp conical taper of the bottom tank portion causes pile up of larvae who descend during molting, thereby increasing larvae mortality.

It is, therefore, a further object of the present invention to provide a method and apparatus for growing shrimp through the larvae stage which is provided with an improved larvae rearing tank structure.

A common practice in the tank rearing of shrimp larvae has developed wherein the larvae are fed a combination diet of prepared food supplemented with live Artemia (brine shrimp). The feeding of such a combination diet requires that an Artemia hatching and collection facility such as that hereinafter described, be included as a part of the overall shrimp rearing system. The use of Artemia thus creates an added cost factor which becomes a significant drawback where shrimp are reared commercially. It has been observed that while the larvae will exhibit adequate growth when reared on a prepared food alone, it must be supplied in such a manner that it will remain continuously available to all of the larvae and not accumulate on the bottom of the tank away from the larvae. Under such conditions, the need for Artemia, and thus Artemia hatching facilities, would be eliminated.

A variety of systems and methods have been employed to date with this goal in mind. However, each of these systems and methods are unsatisfactory in several respects. For example, C. C. Dugan et al., supra, alludes to the use of aeration through air stones at the tank bottom to induce circulation in order to keep prepared food in suspension. Air stones, however, will suspend food for several hours at best after which time the unconsumed food settles on the tank bottom. Not only does the food thereby become inaccessible to most of the larvae, but it will also contaminate the tank medium over a period of time, and increase larvae mortality. In order to preclude the accumulation of large quantities of settled food, several small feedings per day are required rather than one large feeding. While automatic feeders which continuously supply relatively small quantities of food to the tank medium have overcome this drawback to some degree, use of the available automatic feeder still results in the accumulation of too much unconsumed food on the tank bottom. Moreover such available automatic feeders can only dispense food of certain types, and thus restrict optimal food mixtures.

The use of air lift pumping techniques to draw settled food from the bottom of the tank and deposit it at the surface of the tank medium has been proposed. A system of this type would possess the advantage of clearing unconsumed food which has settled on the tank bottom. However, if the food is merely dumped at the surface and not circulated, it will eventually collect on the tank sides beyond the effective influence of the air lifts.

Accordingly, it is a still further object of the present invention to provide a satisfactory system and method which permits the rearing of shrimp larvae solely on a prepared food diet by continuously recirculating unconsumed food through the larvae tank medium.

SUMMARY OF THE INVENTION

In accordance with the principles of the present invention, the above and other objectives are realized via a system for rearing shrimp through the larvae stage wherein the shrimp are subjected to controlled conditions and a common enclosure for the male and female adult or brood shrimp is provided which permits uncontrolled access of the shrimp to one another and wherein the brood shrimp are maintained through a plurality of cycles of mating, spawning and hatching. The system is further provided with filtration means for filtering the medium of the common enclosure and with collecting means for collecting hatched shrimp at preselected times from the common enclosure medium as it moves into the filtration means.

In the present system, the adult brood shrimp are thus maintained in the same enclosure throughout a number of cycles of mating, spawning and hatching, thereby eliminating the time consuming prior art procedures of separating gravid shrimp from the remainder of the brood stock prior to hatching and/or the procedure of separating the female shrimp after hatching from the hatched eggs. The filtration of the enclosure, moreover, maintains the enclosure medium free from contamination, while it simultaneously provides a gentle current which attracts the hatched larvae, thereby aiding the larvae in moving from the enclosure into the collecting means. The latter, in turn, is placed in the intake of the filtration system daily during preselected morning hours, thereby ensuring capture of substantially all the hatched shrimp and preventing mortality due to cannibalism by the adults, which would occur if the hatched shrimp were allowed to remain in the enclosure.

In a further aspect of the system of the invention, a larvae tank for rearing the hatched shrimp is provided whose configuration contributes to a lessening of shrimp mortality. This tank comprises an upper portion, preferably cylindrical, and a lower conical portion whose bottom is truncated to form a flat relatively broad bottom wall. The degree of truncation of this conical portion is such as to prevent significant overcrowding of the hatched shrimp or larvae who descend to the tank bottom during molting, thereby reducing larvae mortality. The tank is also provided with means for daily flushing of a considerable portion of the tank medium whereby the medium is kept substantially contaminant free. During this procedure, the larvae are confined within the tank bottom, but are afforded ample room due to the truncation thereof. Means is also provided for refilling the tank through a dispersive water flow, this type of flow being such as not to damage the larvae.

In yet a further aspect of the invention, an apparatus and method for feeding shrimp larvae is provided which permits the rearing of the larvae on prepared food without live Artemia. In this apparatus and method, food deposited in the larvae tank and settling on the tank bottom is recirculated through the medium by at least one food recirculating apparatus or means. The food recirculating means includes a first conduit means positioned in the tank medium with its inlet located near the tank bottom, a second conduit means in fluid communication with the first conduit means with a discharge outlet located near the surface of the rearing medium and pumping means. The second conduit means is shaped such that the force of discharge from its discharge outlet has a directional component both parallel to the rearing medium surface and perpendicular to a line radiating from the geometric center of the rearing medium surface. In the preferred embodiment, the first conduit means is an elongated conduit vertically positioned near the center of the tank and the second conduit means is generally L-shaped. In operation, the force of the discharge of settled food imparts a circular flow to the medium. The circular flow aids in dispersing the discharged food through the rearing medium thereby making it available to all of the larvae. Settled food is continuously recycled in this manner until it is completely consumed.

Where a plurality of food recirculating means of the preferred configuration are used, the dimensions of each L-shaped conduit can be chosen such that discharge occurs at discrete radial distances from the center of the surface of the rearing medium. Specifically, each L-shaped conduit has a first section connected to an elongated conduit, and a second section transverse, preferably perpendicular, to the first. The first section of each L-shaped conduit is of a predetermined length different from that of every other L-shaped conduit. Thus, the position of the discharge outlet of each second section is at a discrete radial distance from the center of the rearing medium surface. The use of a plurality of food recirculating means constructed in this manner greatly increases the likelihood that prepared food will be continuously placed within the reach of all the larvae.

The larvae feeding apparatus and method of the present invention is adapted for the use with larvae tanks of any type. However, when used with either the improved larvae tank structure described above, or known conical larvae tanks, an additional advantage is obtained. The conical taper of these larvae tanks coupled with the circular flow of the medium prevents unconsumed food from collecting on the tank sides and insures that the food will return to the center bottom of the tank where it can be drawn into the inlet of the first conduit means.

Since the food recirculating means of the present invention will convey any larvae which have drifted to the bottom of the tank along with the settled food, it is advantageous to choose pumping means which pose the minimum risk of injury to the larvae thus conveyed. Accordingly, the preferred pumping means is of the air lift type rather than, for example, the rotary or reciprocating type which mechanically act on the medium pumped.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
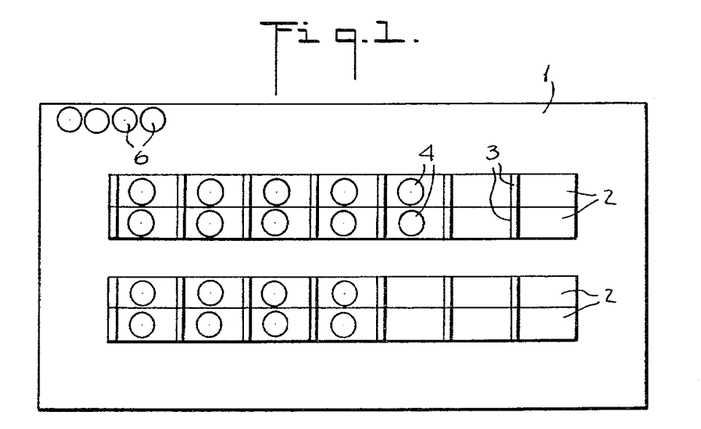
FIG. 1 shows in schematic fashion an overall view of a system embodying the apparatus and method of the present invention.

FIG. 1 shows in schematic fashion an overall view of a system embodying the shrimp rearing apparatus and method of the present invention. The system is housed within a concrete building 1 so as to aid in maintaining the system under controlled conditions. The system comprises a plurality of similar common enclosures or tanks 2 each of which serves simultaneously as a mating, spawning and hatching tank. These tanks are arranged in rows of adjacent columns and each is provided immediately adjacent one of its narrow walls with a filtration means also in the form of a tank 3.

Figure 2:
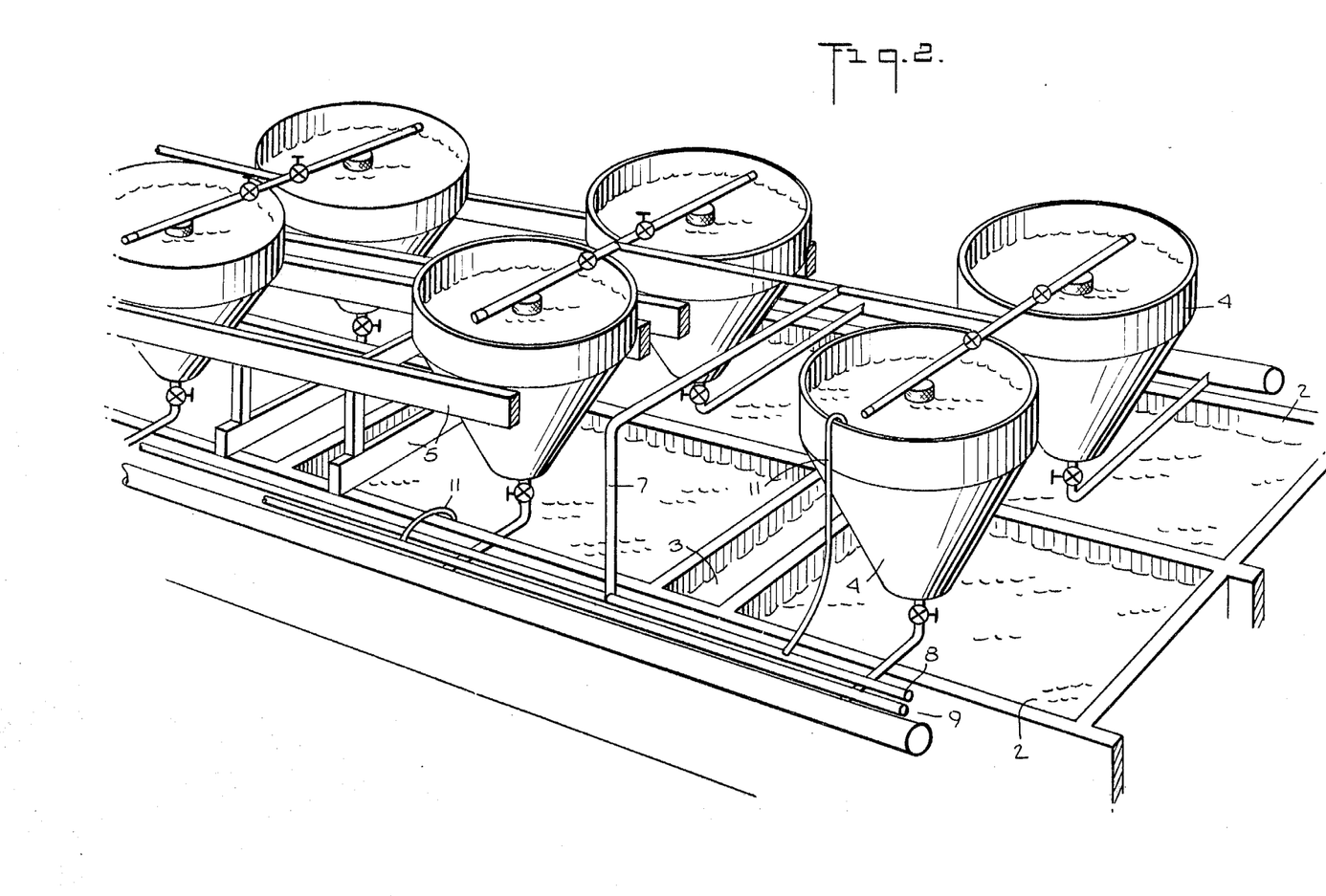
FIG. 2 shows in perspective view the larvae tanks, brood tanks and filtration tanks of FIG. 1.

As shown more clearly in FIG. 2, a number of larvae rearing tanks 4 are supported in frames 5 immediately above the brood tanks 2. A further number of Artemia tanks 6 are arranged in an area adjacent the tanks 2. Water is supplied to the tanks 2, 4 and 6 from delivery pipes 7 coupled to a common manifold 8. Another manifold 9 is also provided for carrying air under pressure. From this manifold air is coupled via air lines 11 to air stones 12 in various tanks and to air lifts 13 in the filtration tanks 3. (See FIG. 3).

Although not specifically shown, heaters are provided adjacent the tank area for controlling the air temperature and for maintaining the temperature of water in the tanks at a predetermined level. Likewise, artificial lighting 14 (see FIG. 3) whose on and off period is controlled, as will be discussed hereinbelow, is provided above the tanks so as to ensure a preselected lighting period.

Figure 3:
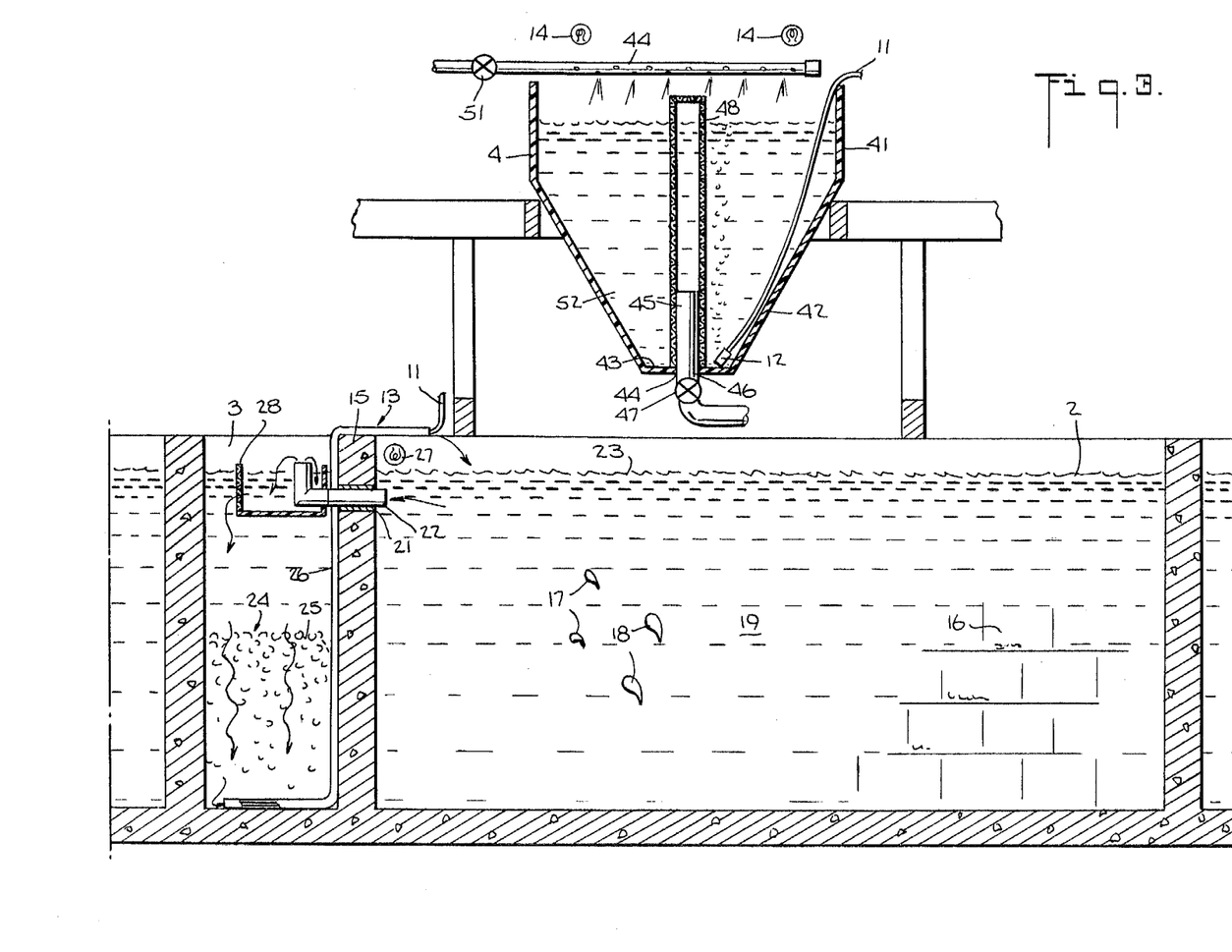
FIG. 3 is a cross section taken through a larvae tank, filtration tank and brood tank of FIG. 2.

As can be seen from FIG. 3, each of the common enclosures or tanks 2 has a common wall 15 with its adjacent filtration tank 3. Individual habitats 16 are provided within the enclosure 2, these habitats being provided for adult male and female shrimp 17 and 18 deposited therein. These habitats open into a common area 19 which is freely accessible to all the shrimp at all times.

Openings 21 in the common wall 15 receive pipe or conduit 22 for delivering the enclosure medium 23 from the enclosure into the filter tank 3. The lower portion of the filter tank 3 is provided with a bio-filter 24 comprised of coral rock 25 upon which live nitrification bacteria. This bio-filter filters the incoming medium 23 which is then conveyed via a conventional air-lift 13 comprising air line 11 and conduit 26 back into the enclosure. This filtration maintains medium 23 substantially free of contaminants and debris and avoids having to frequently fill and refill the large enclosure volume. Typically, the filtration system is adjusted to maintain the following acceptable contaminant levels in the medium 23: less than 1 ppm ammonia; less than 10 ppm nitrite-nitrate; a pH of $7.0 \pm 1.0$ and a dissolved oxygen level greater than 5 ppm. Also the medium is made slightly brackish to aid in the prevention of disease and encourage spawning. Typically, a salinity of $3 \pm 1$ ppt is acceptable.

Figures 5, 6, 7, 9, 10:
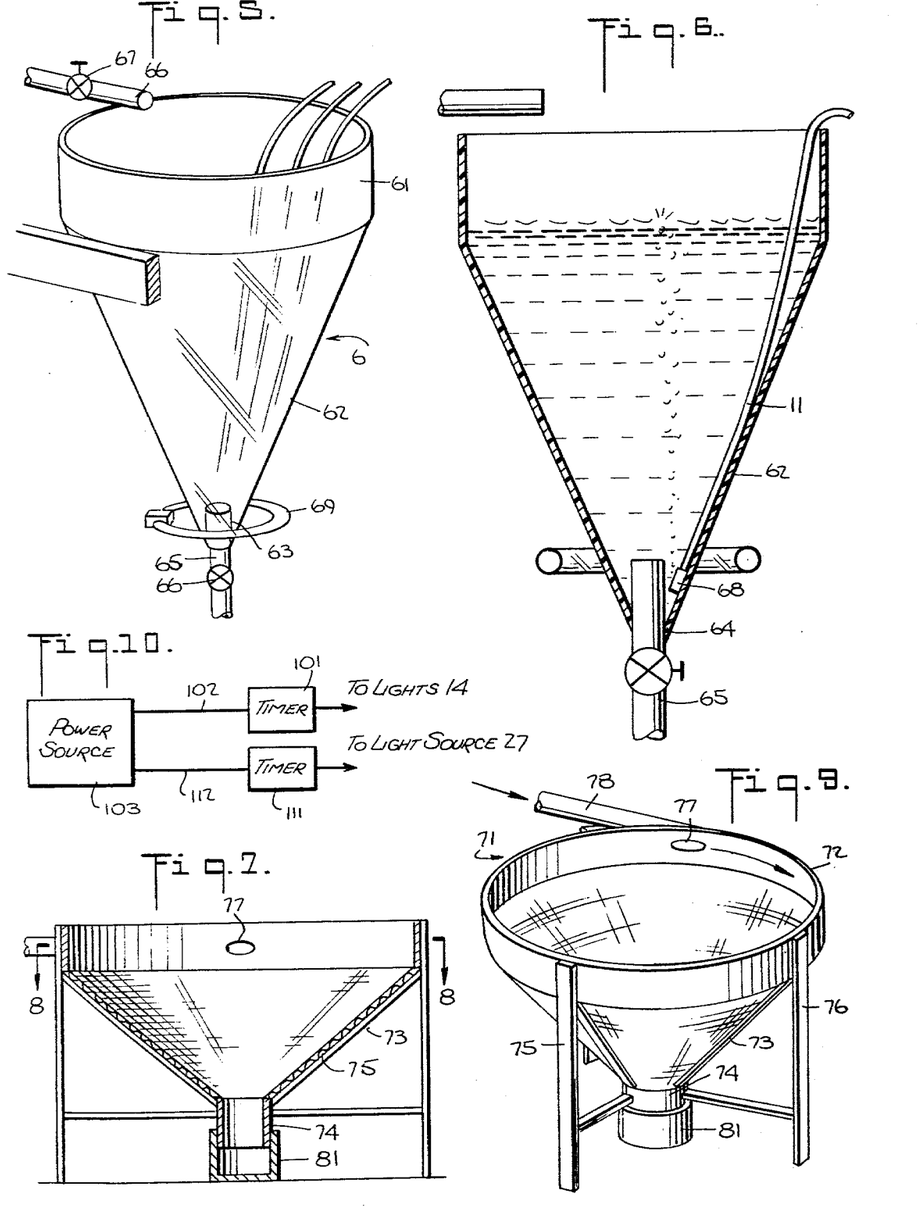
FIGS. 5 and 6 show perspective and cross section views of an Artemia tank of the system of FIG. 1.
FIG. 10 shows in block diagram form the electrical control for lights of the system of FIG. 1.

As above noted, both the lighting and temperature of the building 1 are controlled so as to subject the shrimp in all the tanks to predetermined conditions. In particular, the lighting is controlled so that light is provided for a 14 hour period per day. This is accomplished in a conventional manner as shown in FIG. 10 by providing a standard timer 101 in the electrical line 102 connecting the power source 103 to the lights 14. Typically, the timer is set so that the lights are turned on at 7 a.m. and off at 9 p.m. The temperature control, on the hand, is effected, as above noted, through the use of conventional space heaters in the area adjacent the tanks. These heaters are set so that the shrimp are subjected to a temperature of approximately 28.5° C.

Typically, each enclosure 2 is provided with 8 adult male and 50 adult female shrimp. These shrimp, as above-noted, have free access to the common area 19 of their enclosure and due to the aforementioned artificial environmental conditions provided go through the rearing stages of mating, spawning and hatching continuously year round. Typically, under these conditions each female shrimp can be made to reproduce every 6 weeks. After mating has occured and a female's eggs are fertilized, the gravid female is maintained in its respective enclosure 2 and allowed to hatch her eggs, which typically might take an eighteen day period.

Once the eggs of the female are hatched, the baby shrimp or larvae are in the same enclosure 2 as that containing the female and the other adult shrimp. While normally the hatching of the eggs of a gravid female in the same tank with other adult shrimp is to be avoided, due to the cannibalistic tendencies of the adults, this problem is obviated in the present system by collecting hatched larvae during the hours that immediately follow the period of greatest likelihood of hatching. Thus, the substantial bulk of hatched larvae are removed from the enclosures 2 soon after hatching, and mortality at the hands of the adult shrimp is substantially precluded.

More specifically, collection of the hatched larvae, which are free swimming, from each enclosure 2 is brought about, in part, by the water movement or current created by the filtration of the enclosure, as well as by additional lighting provided at preselected time periods. The latter lighting is in the form of a light source 27 placed adjacent the opening of the conduit 22 carrying water from the enclosure 2 into the filter tank 3. This light illuminates the water leading to the conduit and is controlled, likewise, via a conventional timer 111 in the power line 112 connecting the power source 103 to the light, so as to turn on daily between preselected morning hours and, in particular, from approximately 2 a.m. to 7 a.m. The actual collecting of the larvae is carried out by the placement of collection boxes 28 (FIGS. 3 and 4) in the filtration tank 3 and the connection of these boxes to the conduit 22 carrying water into the tank.

Figures 4, 8:
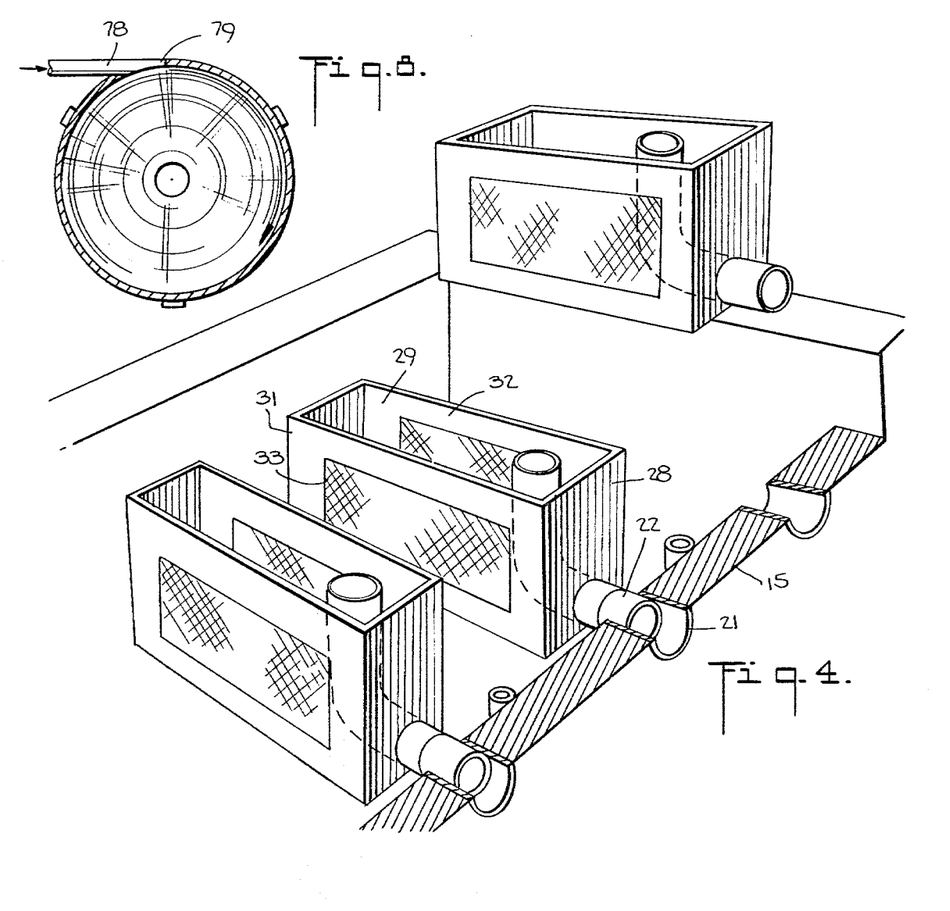
FIG. 4 shows in perspective view a collection means in the filtration tank of FIG. 3.
FIGS. 7-9 illustrate perspective, cross section and top view of an Artemia collector in accordance with the system of the invention.

These boxes have open tops 29 and two opposing apertured sidewalls 31 and 32. The apertures are closed off by mesh 33 of sufficiently small mesh size to trap hatched larvae, while permitting passage of the medium 23. The collection boxes are typically positioned in their respective filtration tanks in the evening and removed in the morning.

In general, the eggs of a gravid female are found to hatch between the hours of 12 a.m. to 2 a.m. The resultant hatched larvae, in turn, are phototrophic and, thus, are attracted to light. Thus, with the present system, the bulk of the larvae hatched in each enclosure 2 each day will be hatched between the aforesaid early morning hours and immediately upon hatching, or soon thereafter, these larvae will be subjected to the light from the source 27, which is strongest in the area of the enclosure adjacent the conduit 22. The larvae will then be attracted to the light and proceed to the aforesaid lighted area. The mild current of the medium 23, due to the filtration thereof, will thereupon further attract the larvae who will then follow the current and proceed into and through the conduit 22 and thereafter into the collection box 28, which has previously been connected thereto. The meshed sides of the box will then prevent passthrough of the larvae, while permitting passthrough of the medium 23. As a result, the larvae will collect in the box for subsequent transfer when the box is detached from the conduit.

With the present system, it has been found that a plurality of cycles of mating, spawning and hatching of the adult shrimp can be carried out using the common enclosures 2 without serious mortality and with a high yield of hatched larvae. Additionally, the use of the filtration tanks 3 adjacent the enclosures 2 extends adult shrimp life by greatly reducing contaminants, while it further aids in the larvae collection process. Collection of hatched larvae daily at preselected morning hours, moreover, ensures maximum collection and substantially nullifies mortality due to cannibalism, thereby allowing hatching in the common enclosures 2.

After collection of the hatched larvae, they are transferred from the larvae collection boxes to the larvae tanks 4 where they are reared through the larvae stage of development. As illustrated in FIGS. 2 and 3, each of the larvae tanks 4 comprises an upper portion 41, shown as cylindrical, and a lower conical portion 42 whose bottom is truncated to form a flat, relatively broad bottom wall 43. Typically, the ratio of the width of the bottom wall 43 to the upper mouth of the conical portion is about one to three.

Passing through an aperture 44 in the flat bottom wall 43 is a standpipe 45 which extends upwardly into the conical portion to about one third of its height. Outside the conical portion, the standpipe connects to a discharge line 46 which is controlled by a valve 47. Inside the conical portion, the standpipe is surrounded by a cylindrical apertured sleeve 48 which extends upward beyond the end of the standpipe 45 to the top portion 41 of the tank. The sleeve is further surrounded by a thin mesh, so that the apertured portions, therefore, are rendered incapable of passing larvae therethrough.

Situated above the top portion 41 of the larvae tank 4 is a conduit which is formed as a finely apertured bar 49. This conduit receives a medium to be supplied to the tank whose flow is controlled by a valve 51.

The truncation of the lower conical portion 42 of the larvae tank 4 decreases significantly the mortality of the larvae, since it prevents overcrowding of the larvae during molting and draining of the tank. The latter is accomplished by opening the valve 47 which causes the medium 52 in the tank to pass through the apertures in the sleeve 48 and from there through the standpipe 45 until the tank level is at the level of the later, whereupon drainage ceases. During drainage, the larvae are prevented from being flushed out by the mesh on the sleeve 48 and, therefore, all gather in the lower conical portion 42. However, due to the relatively broad extent of this tank portion, they are not congested or overcrowded and, thus, are not significantly disturbed by the drainage process. As a result, drainage of the tank can be carried out daily, with the added benefit that medium 52 is maintained substantially contaminant free. This also significantly enhances larvae life.

Another benefit of this broad extent of the lower tank portion is that it provides an area where molting larvae can descend and not be overcrowded. Again, this enhances larvae life.

After the tank has been drained, as aforesaid, the tank is filled by opening the valve 51 controlling the flow of medium 52 to the fill bar 49. Typically, the salinity of the medium 52 is maintained at 14±0.5 ppt and the medium is preheated to 28.5±0.5° C. so that it is at the same temperature as the medium already in the tank. Due to the plurality of holes in the bar 49, the fill water enters the tank as a spray. This also is beneficial to the larvae life, as the spray is sufficiently dispersive so as not to harm the larvae.

The larvae in the larvae tanks 4 are subjected to substantially the same artificial light and temperature conditions as the adult shrimp in the enclosures 2. Thus, the larvae receive light for a 14 hour period between 7 a.m. and 9 p.m. and, as above noted, the temperature of the water in the tanks is maintained at 28.5° C. The larvae are also provided with aeration via the air stones 12 placed in the larvae tanks. These stones are fed by the air lines 11 which couple to the air manifold. The air stones aid in circulating the tank medium, which promotes larvae and food suspension.

As above noted, the system of the invention is further provided with an additional set of tanks 6 which are used for Artemia (Brine shrimp) hatching. Artemia are employed as supplemental food for the larvae. Each Artemia tank 6 (FIGS. 5 and 6) has an upper cylindrical portion 61 and a lower conical portion 62. The latter portion, at its apex 63, is provided with an aperture 64 through which extends a conduit 65. This conduit is provided with a drain valve 66 whose operation permits draining of the tank and collection of the Artemia. In the interior of the tank, the conduit 65 extends upwardly and forms an annular container with the inner sidewall of the apex, which container acts as a debris collector. Medium is provided to the tank via a conduit 66 also controlled by a valve 67 and air is provided by air lines 11 extending into the tank and feeding air stones 68. Exterior to the tank and surrounding the region thereof above the top of the conduit which ends above the apex 63 of the bottom tank portion, is an annular light 69.

Collection of the Artemia is carried out by turning off the air being supplied to the tank via the line 11 and air stone 68 and turning on light 69. The tank is allowed to remain in this condition for a short period of time, such as, for example, twenty minutes. During this time a substantial amount of the debris which has accumulated in the tank settles out and is collected in the annular container formed by the end of the conduit 65 and the inner wall of the lower bottom tank portion above the apex 63. On the other hand, the Artemia are attracted to the lower tank portion above the top end of the conduit 65 and surrounded by the light 69. Subsequent operation of the valve 66 to allow substantial draining of the tank thus results in the Artemia being removed from the tank substantially free of accumulated debris, which, as above-noted, now lies below the top end of the conduit and between the latter and the inner tank wall.

During the aforesaid collection operation, in order to facilitate gathering of the Artemia in the tank, via attraction by the light 69 it is preferable that the sides of the tank above the tank region in the vicinity of the light 69 be dark and further that a lid be placed on the tank. Additionally, the tank in the vicinity of the aforesaid tank region should be clear, so as to permit the light from the source 69 to illuminate same and thereby attract the Artemia thereto.

As shown in the drawings, during the draining of the tank 6, the output line is coupled to an Artemia collector 71 (FIGS. 7, 8 and 9) having an upper cylindrical portion 72 to which connect three sloping legs 73 whose ends connect to an annular sleeve 74. A meshlike structure 75 extends from the upper cylindrical portion 72 around the legs 73 and to the sleeve forming a funnel-like structure whose sidewalls are, preferably, at an angle greater than 50 degrees relative to the vertical. Three further support legs 76 extend straight downward from the upper cylinder portion 72 and act as support legs for standing the collector. The upper cylinder portion is provided with an aperture 77 through which extends an intake tube whose end 79 is tapered to guide incoming fluid around the cylinder wall. A further cup-like member 81 is arranged below the sleeve 74.

When the medium with the Artemia leaves the Artemia tank, it is carried to the intake 78 and coupled into the collector along the cylindrical wall. The mesh 75 permits passage of the medium, but inhibits Artemia passage. As a result, the Artemia are conveyed by the mesh to the bottom sleeve 74 and into the cup 81, where they are collected.

As hereinbefore noted, the system of the invention is additionally provided with an apparatus and method for feeding shrimp larvae which permits the rearing of the larvae on prepared food without live Artemia. This feeding system can replace air lines 11 and air stones 12 disposed in the larvae tank of FIG. 3 since it performs both the function of circulating food and provides aeration to the tank.

Figures 11, 12, 13, 14:
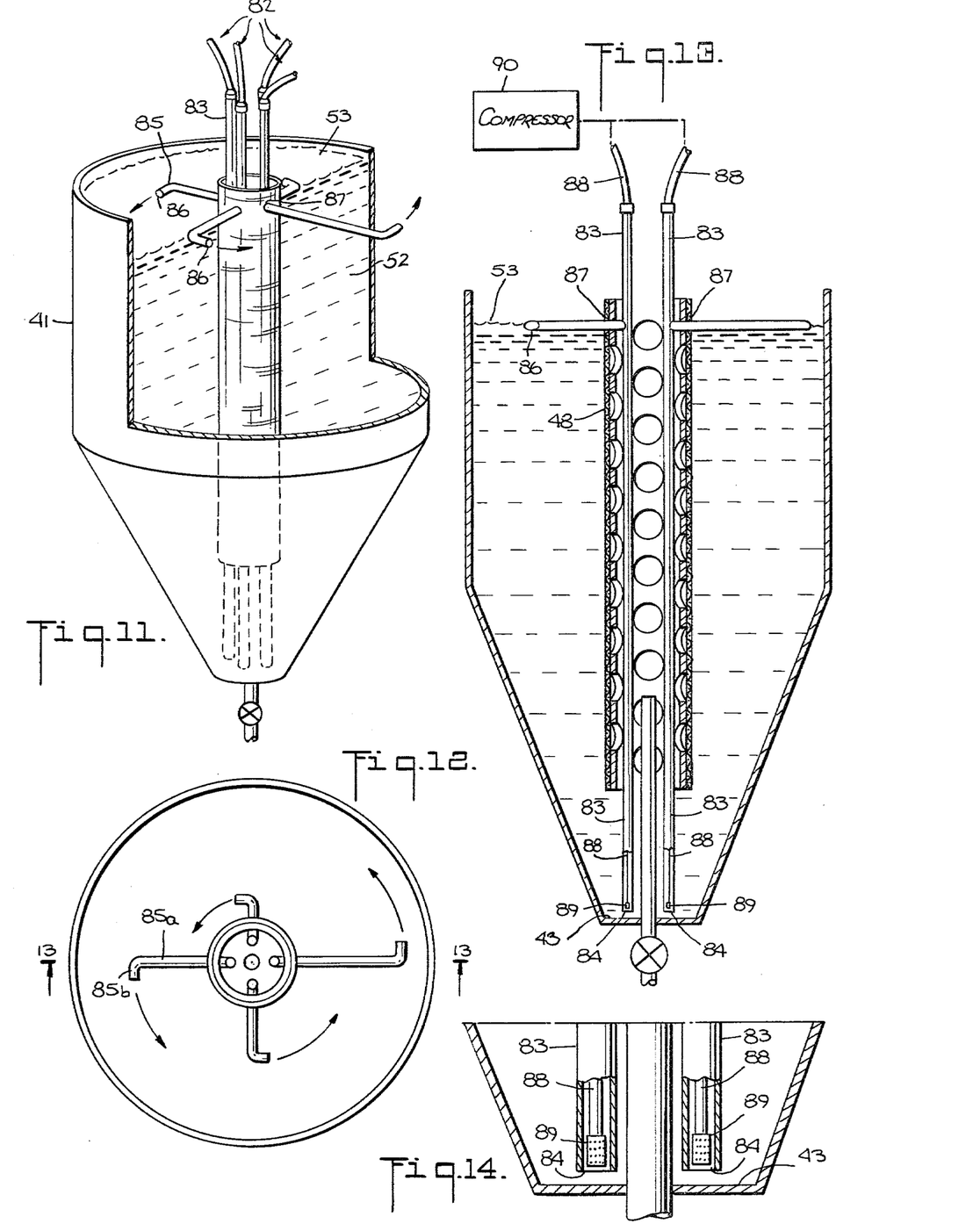
FIG. 11 shows in partial cross section a perspective view of a larvae tank with four food recirculating means.
FIG. 12 shows a top view of the larvae tank and food recirculating means of FIG. 11.
FIG. 13 illustrates a cross section of the larvae tank and food recirculating means of FIGS. 11 and 12, taken along line 13—13 of FIG. 12.
FIG. 14 shows an enlargement of the lower portion of the cross sectional view of FIG. 13.

FIGS. 11-14 show various views of a preferred embodiment of the present feeding system placed in a larvae tank of the improved structure hereinbefore discussed. The illustrated embodiment shows four food recirculating means 82 placed in the rearing medium 52 of a larvae tank. Each food recirculating means includes a first conduit means positioned in the rearing medium, a second conduit means in fluid communication with the first conduit means and pumping means. In the present instance, each first conduit means is an elongated conduit 83 vertically positioned adjacent to the center of the tank. Each elongated conduit has a middle portion surrounded by sleeve 48 and upper and lower portions protruding from either end of sleeve 48. Inlet 84 of the elongated conduit is located near the tank bottom 43. Second conduit means is a generally L-shaped conduit 85 either connected to the elongated conduit 83 or integrally formed therewith at a point near the surface 53 of the medium. The L-shaped conduit has a discharge outlet 86 located near the surface of the medium and oriented parallel thereto. The L-shaped conduit is formed of a first section 85a and a second section 85b which is integral with and transverse, preferably perpendicular, to the first section. Each first section of each L-shaped conduit projects outwardly away from the center of the larvae tank and through an aperture 87 in the upper portion of sleeve 48. As illustrated in FIGS. 13 and 14, the pumping means of this embodiment consists of an air lift which includes a source of compressed air, for example, compressor 90, and an air hose 88 with its inlet connected to said source. An end section of the air hose is positioned within the elongated conduit 83 and terminates at diffuser 89 which is coupled to the outlet of the air hose. The diffuser can be, for example, an air stone. Diffuser 89 is proximate to the inlet 84 of the elongated conduit 83.

All of the four food recirculating means 82 of the illustrated embodiment are identical to each other except in the long dimension of the first section 85a of the L-shaped conduit 85. As most clearly shown in FIG. 12, each said first section has a predetermined length different from the predetermined lengths of each other first section. The net result is that the discharge outlets 86 are located at discrete radial distances from the center of the rearing medium surface 53.

In operation, prepared food deposited in the rearing medium and settling on the tank bottom 43 is drawn into inlets 84 due to the low fluid pressure created in each elongated conduit 83 by the infusion of compressed air from diffusers 89. The settled food is pumped in this manner through the elongated conduits and into each L-shaped conduit 85 to the discharge outlets 86. Since the discharge outlets are oriented parallel to the rearing medium surface 53, the force of discharge of settled food therefrom into the rearing medium 52 imparts a circular flow to the medium. The circular flow aids the even dispersion of food throughout the medium. The dispersive effect is further enhanced by the fact that the food is deposited at the surface at several discrete radial distances from the center. Since in the present system prepared food is continuously recirculated until it is entirely consumed by the larvae, only one feeding daily is required.

While the preferred embodiment of the present feeding system includes an elongated conduit and an L-shaped conduit arranged as shown in FIGS. 11-14, the first and second conduit means can be chosen from a variety of configurations. The choice of shape and position is guided by the fact that the first conduit means has an inlet located near the tank bottom and the discharge outlet of the second conduit means is located near the surface of the medium. In addition, the discharge outlet is oriented such that the discharge of settled food therefrom will impart a circular flow to the medium. In other words, the force of discharge has a directional component parallel to the rearing medium surface and perpendicular to a line radiating from the surface's geometric center.

It should be noted again that the feeding system of the present invention is adapted for use with larvae tanks of any structure. However, the preferred structure includes a lower conical portion with the bottom forming either a flat wall 43 shown in FIG. 13 or an apex as in the Artemia tank structure of FIGS. 5 and 6. The conical taper of either of these tank structures coupled with the circular flow of the medium prevents unconsumed food from collecting on the tank sides and contaminating the medium. Also, this shape insures that the unconsumed food will return to the center bottom of the tank where it can be drawn into the inlet of the first conduit means, e.g., inlet 84 of the elongated conduit of FIGS. 11-14.

It should be noted that the apparatus and method of the present invention as disclosed hereinabove are particularly adapted to the rearing of shrimp of the Macrobrachium Rosenbergii species, although with suitable modification, the system and apparatus can be adapted to other species of shrimp as well as to other types of crustaceans.

In all cases, it is understood that the above-described arrangements are merely illustrative of the many possible specific embodiments which represent applications of the present invention. Numerous and varied other arrangements can readily be devised without departing from the spirit and scope of the invention.

What is claimed is:

1. An apparatus for recirculating food settled on the bottom of a larvae tank through the rearing medium of the larvae tank, the apparatus comprising
    first conduit means disposed in the rearing medium having an inlet located near the bottom of the larvae tank;
    second conduit means in fluid communication with said first conduit means having a discharge outlet located near the surface of the rearing medium, and being of a shape such that the force of discharge from said discharge outlet has a component parallel to the rearing medium surface and perpendicular to a line radiating from the geometric center thereof; and
    pumping means for moving a mixture of settled food and rearing medium from the bottom of the larvae tank through said first conduit means and said second conduit means to the discharge outlet of said second conduit means;
    whereby the discharge of said mixture from said discharge outlet into the rearing medium imparts a circular flow to the medium.

2. Apparatus in accordance with claim 1 wherein said pumping means includes
    a source of compressed air; and
    an air hose connected to said source, said air hose having an end section disposed within said first conduit means with an outlet coupled to a diffuser positioned near the inlet inlet of said first conduit means.

3. Apparatus in accordance with claim 1 wherein said second conduit means is integral with said first conduit means.

4. Apparatus for feeding shrimp larvae comprising
    a larvae tank containing a rearing medium, shrimp larvae and prepared food settling out of the rearing medium; and
    a plurality of food recirculating means, each including
        an elongated conduit vertically positioned in the larvae tank proximate to its center and having an inlet located near the bottom of the larvae tank,
        an L-shaped conduit including a first section connected to said elongated conduit at a point near the surface of the rearing medium and a second section integral with said first section and transverse thereto, having a discharge outlet located near the surface of the medium and oriented parallel to the surface of the medium, and
        pumping means for moving a mixture of settled food and rearing medium from the bottom of the larvae tank through said elongated conduit and said L-shaped conduit to said discharge outlet of said second section of said L-shaped conduit,
    whereby the discharge of said mixture from each said discharge outlet into the rearing medium imparts a circular flow to the medium.

5. Apparatus in accordance with claim 4 wherein each said first section of each L-shaped conduit has a predetermined length different from the predetermined length of each other said first section such that the discharge of said mixture from each discharge outlet into the rearing medium occurs at discrete radial distances from the center of the surface of the medium.

6. Apparatus in accordance with claim 5 wherein said larvae tank comprises
    an upper portion;
    a lower conical portion extending from said upper portion and having an aperture at the bottom thereof;
    a standpipe extending through said aperture into said conical portion to a predetermined portion of its height; and
    a sleeve having apertures therethrough and mesh covering said apertures, said sleeve being disposed in surrounding relationship to said pipe and having a height which extends to the surface of said rearing medium.

7. Apparatus in accordance with claim 6 wherein said elongated conduit has a middle portion disposed within said sleeve, and upper and lower portions protruding from either end of said sleeve.

8. Apparatus in accordance with claim 7 wherein said first section of said L-shaped conduit protrudes through an aperture in the upper portion of said sleeve.

9. Apparatus in accordance with claim 8 wherein said pumping means includes
    a source of compressed air; and
    an air hose connected to said source, said air hose having an end section disposed within said elongated conduit with an outlet coupled to a diffuser positioned near the inlet of said elongated conduit.

10. Apparatus in accordance with claim 9 wherein said L-shaped conduit is integral with said elongated conduit.

11. Apparatus in accordance with claim 10 wherein the bottom of said lower conical portion of said larvae tank forms a flat wall.

12. Apparatus in accordance with claim 10 wherein the bottom of said lower conical portion of said larvae tank forms an apex.

13. A method of recirculating settled food through the rearing medium of a larvae tank comprising
    conveying a mixture of settled food and rearing medium from the bottom of the larvae tank to a discharge point at or above the surface of the rearing medium;
    discharging said mixture from said discharge point in a direction such that the force of discharge into the rearing medium has a component parallel to the rearing medium surface and perpendicular to a line radiating from the geometric center thereof, thereby imparting a circular flow to the rearing medium.

14. A method in accordance with claim 13 wherein the step of conveying comprises
providing first conduit means disposed in the rearing medium having an inlet located near the bottom of the larvae tank, second conduit means in fluid communication with said first conduit means having a discharge outlet located near the surface of the rearing medium and pumping means;
pumping said mixture via said pumping means from the bottom of the larvae tank through said first conduit means and said second conduit means to said discharge outlet.

15. A method in accordance with claim 14 wherein said pumping step comprises air lifting said mixture from the bottom of the larvae tank through said first and second conduit means to said discharge outlet.

16. A method of feeding shrimp larvae placed in the rearing medium of a larvae tank comprising
depositing prepared food in the rearing medium;
permitting said prepared food to settle to the bottom of the larvae tank;
conveying a mixture of settled food and rearing medium from the bottom of the larvae tank to a plurality of discharge points at the surface of the rearing medium;
discharging said mixture from each of said discharge points in a direction such that the force of discharge into the rearing medium has a component parallel to the rearing medium surface and perpendicular to a line radiating from the geometric center thereof, thereby imparting a circular flow to the rearing medium.

17. A method in accordance with claim 16 wherein the step of conveying comprises
providing a plurality of food recirculating means, each including
an elongated conduit vertically positioned in the larvae tank proximate to its center and having an inlet located near the bottom of the larvae tank,
an L-shaped conduit including a first section connected to said elongated conduit at a point near the surface of the rearing medium and a second section intergral with said first section and transverse thereto, having a discharge outlet located at the surface of the medium and oriented parallel to the surface of the medium, and
pumping means; and
pumping said mixture via each pumping means of each food recirculating means from the bottom of the larvae tank through each elongated conduit and L-shaped conduit to the discharge outlet of said second section of each said L-shaped conduit.

18. A method in accordance with claim 17 wherein the step of providing a plurality of food recirculating means includes providing L-shaped conduits each with a first section of a predetermined length different from the predetermined length of each other said first section.

19. A method in accordance with claim 18 wherein said discharging step includes discharging said mixture from each said discharge point at a discrete radial distance from the center of the surface of said medium.

20. A method in accordance with claim 19 wherein said pumping step comprises
air lifting said mixture from the bottom of the larvae tank through each elongated conduit and L-shaped conduit to the discharge outlet of said second section of each said L-shaped conduit.

* * * * *